(12) United States Patent
Yamato

(10) Patent No.: US 7,298,748 B2
(45) Date of Patent: Nov. 20, 2007

(54) METHOD OF PACKET TRANSMISSION AND WIRELESS COMMUNICATION DEVICE

(75) Inventor: Katsumi Yamato, Chiba-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1057 days.

(21) Appl. No.: 10/255,610

(22) Filed: Sep. 27, 2002

(65) Prior Publication Data

US 2003/0099207 A1    May 29, 2003

(30) Foreign Application Priority Data

Sep. 28, 2001    (JP) ............................. 2001-301369

(51) Int. Cl.
*H04L 12/56* (2006.01)
(52) U.S. Cl. ................. 370/395.41; 370/278; 370/326; 370/443
(58) Field of Classification Search ................ 370/230, 370/234, 235, 277, 278, 282, 294, 321, 326, 370/329, 336, 337, 345, 347, 348, 395.4, 370/395.41, 437, 442, 443, 458, 468, 236, 370/461
See application file for complete search history.

(56) References Cited

U.S. PATENT DOCUMENTS

| | | | | |
|---|---|---|---|---|
| 5,862,171 | A * | 1/1999 | Mahany ........................ | 375/132 |
| 6,970,440 | B1 * | 11/2005 | Schmidl et al. .............. | 370/330 |
| 6,973,067 | B1 * | 12/2005 | Haartsen ...................... | 370/337 |
| 7,039,038 | B2 * | 5/2006 | Shoemake ................... | 370/349 |
| 7,142,880 | B2 * | 11/2006 | Schmandt et al. ........... | 455/515 |
| 2002/0071413 | A1 * | 6/2002 | Choi ............................ | 370/337 |
| 2002/0122413 | A1 * | 9/2002 | Shoemake ................... | 370/349 |
| 2002/0126692 | A1 * | 9/2002 | Haartsen ..................... | 370/450 |
| 2003/0021262 | A1 * | 1/2003 | Ma et al. ..................... | 370/352 |

FOREIGN PATENT DOCUMENTS

| | | | |
|---|---|---|---|
| EP | 1185038 A2 | * | 3/2002 |
| EP | 1376996 A2 | * | 1/2004 |

OTHER PUBLICATIONS

Chawla, S. et al., "QoS Based Scheduling for Incorporating Variable Rate Coded Voice in Bluetooth," IEEE Conference on Communications, 2001. ICC 2001. Jun. 2001, vol. 4, pp. 1232-1237.*

* cited by examiner

*Primary Examiner*—Chi Pham
*Assistant Examiner*—Donald L Mills
(74) *Attorney, Agent, or Firm*—Oblon, Spivak, McClelland, Maier & Neustadt, P.C.

(57) ABSTRACT

Provided is a method of packet transmission capable of efficiently utilizing ACL link resources in transmitting and receiving packets after an ACL link is established in Bluetooth. A Bluetooth device A determines the maximum rate for packet size to be transmitted to a Bluetooth device B established in the link based on the ratio between a token rate A requested by the device A and a token rate B requested by the device B. When the token rate A is greater than the token rate B, the maximum rate N is set from the candidates of current time slot numbers occupiable as an ACL packet. When the token rate A is smaller than the token rate B, a rate is selected from the candidates of current time slot numbers occupiable as the ACL packet based on rate U=N×token rate A/token rate B.

16 Claims, 17 Drawing Sheets

METHOD OF PACKET TRANSMISSION AND WIRELESS COMMUNICATION DEVICE

BACKGROUND OF THE INVENTION

The present invention relates to a wireless communication device capable of transmitting and receiving data in packets after a short-range wireless communication unit is used to establish a link, and to a method of packet transmission between the wireless communication devices.

In recent years, systems adapting the Bluetooth™ standard have been developed, the Bluetooth standard uses frequency hopping in a waveband of 2.4 GHz to transmit and receive data among discrete devices. For example, devices such as cellular phones, PHSs (Personal Handyphone Systems), personal computers, and personal digital assistants are mounted with a wireless module of the Bluetooth standard and the Wireless module is used to transmit and receive data, whereby data can be transmitted and received among discrete devices. Hereafter, a device mounted with the wireless module of the Bluetooth standard is denoted as BT device.

When the BT devices have been connected through a radio rink, data can be transmitted and received among these BT devices. At this time, any one of the BT devices is operated as a master, and the other BT devices are operated as slaves.

In Bluetooth, a channel is divided into time slots having a length of 625 microsecond, and they are given slot numbers according to the Bluetooth clock of a piconet master. A slot number is given in order of 0 to $2^{27}-1$, and it is returned to zero when reaching $2^{27}-1$. The BT devices, both the master and slaves, transmit packets using these time slots.

In Bluetooth, the TDD (Time Division Duplex) scheme is used in which the master and the slaves alternately transmit. The master can start to transmit packets only at even numbered time slots. Then, as long as the master transmits packets to the slave itself, the slave can start to transmit packet only at odd numbered time slots placed next to the time slots where the packets have been transmitted. In addition, both the master and slaves can transmit packets extended over five time slots at maximum.

In the meantime, link types of Bluetooth have an SCO (Synchronous Connection) Oriented) link and an ACL (Asynchronous Connection-Less) link. The SCO link is circuit-switched connection in which time slots are reserved at every fixed time interval to communicate, suitable for handling voice traffic, whereas the ACL link is packet-switched connection in which time slots not reserved by the SCO link are used to communicate, suitable for handling data traffic.

FIG. 16 depicts one example of the packet (ACL packet) communication between a master and a slave 1 or slave 2 using the ACL link. In the example shown in FIG. 16, the master transmits an ACL packet having a length of five time slots to the slave 1 at an even numbered time slot 2n. At this time, the slave 1 received the ACL packet from the master is given the right to transmit an ACL packet to the master at an odd numbered time slot 2n+5. In the example shown in FIG. 16, it transmits a packet having a length of three time slots at the time slot 2n+5. In addition, even when the slave 1 does not have information to be transmitted to the master, the other slaves cannot transmit ACL packets using the time slot 2n +5 the example shown in FIG. 16, the master successively transmits an ACL packet having a length of three time slots to a slave 2 at an even numbered time slot 2n+8. The slave 2 received this transmits an ACL packet having a length of three time slots to the master at an odd numbered time slot 2n+11.

SUMMARY OF THE INVENTION

When the BT device is to communicate using the ACL link, it can immediately transmit ACL packets using the time slots not reserved by the SCO link. In addition, as a packet size usable for a single time of ACL packet transmission, it can be extended over five time slots at maximum.

However, when one BT device determines the packet size regardless of the other BT device and it transmits ACL packets, disadvantages are sometimes generated in view of efficient use of ACL link resources.

FIG. 17 depicts one example of the ACL packet communication on the ACL link in the case where a master requests a slave to transmit data equivalent to a length of 15 time slots and a slave requests the master to transmit data equivalent to a length of three time slots simultaneously at every time interval equivalent to a length of 18 time slots. In the example shown in FIG. 17, both the master and slave can transmit an ACL packet of size equivalent to a length of five time slots as the maximum rate for the ACL packet length.

As shown in FIG. 17, time slot positions $\alpha$, $\beta$ and $\gamma$ are the positions that the slave can transmit a packet to the master. However, the slave has already transmitted data equivalent to a length of three time slots at this time, and thus the slave has no data to be transmitted. On this account, it does not transmit data at the time slots $\alpha$, $\beta$ and $\gamma$. More specifically, in the example shown in FIG. 17, 3÷36 nearly equal to 8.3% of ACL link resources have not been used for data communication.

Furthermore, when a communication error is generated on the ACL link in packet transmission, the packet is to be retransmitted. However, in this case, time needed for retransmission becomes longer as the packet size is larger. Consequently, packet transmission performance is deteriorated.

The invention has been made in consideration of the circumstances. The object of the invention is to provide a method of packet transmission and a wireless communication device, capable of efficiently utilizing ACL link resources in transmitting and receiving data in ACL packets after the Bluetooth standard is used to establish the ACL link.

In addition, the object of the invention is to provide a method of packet transmission and a wireless communication device capable of keeping the deterioration of packet transmission performance low in transmitting and receiving data in ACL packets after the Bluetooth standard is used to establish the ACL link.

A method of packet transmission between a first communication device and a second communication device after a link is established by short-range wireless communications, the method of packet transmission comprising: receiving a first average rate from the second communication device, said the first average rate is requested by the second communication device in transferring data to the first communication device from the second communication device; preparing a second average rate which representing an average rate of the data transfer from the first communication device to the second communication device; and determining a maximum packet size of a packet to be transmitted to the second communication device from the first communication device based on a ratio of the first average rate to a second average rate stored in the first communication device in transferring data to the second communication device from the first communication device.

Moreover, the invention is a wireless communication device comprising: a short-range wireless communication unit adapted to transmit and receive data in a packet after a link is established with the other wireless communication device; a receiving unit adapted to receive a first average rate requested by the other wireless communication device established with the link; and a determining unit adapted to determine a maximum rate for packet size to be transmitted to the other wireless communication device based on a ratio between a second data transfer rate to the other wireless communication device and the first data transfer rate, the second data transfer rate stored in the wireless communication device, wherein the short-range wireless communication unit transmits and receives data based on the maximum rate for packet size to be transmitted to the other wireless communication device, the maximum rate is determined by the determining unit.

Additionally, the invention in the device or method can be realized as a program for allowing a computer to execute a procedure corresponding to the invention (or for allowing a computer to function as a unit corresponding to the invention or for allowing a computer to realize a function corresponding to the invention), and it can be realized as a computer readable medium recorded with the program as well.

According to the invention, performance requested by a BT device to be a communication counterpart is compared to set the maximum rate for the ACL packet length in transmitting and receiving data in an ACL packet after the Bluetooth standard is used to establish a link, whereby packet transmission can be provided in which ACL link resources are effectively utilized.

BRIEF DESCRIPTION OF THE DRAWINGS

The teachings of the invention can be readily understood by considering the following detailed description in conjunction with the accompanying drawings, in which.

DESCRIPTION OF THE PREFERRED EMBODIMENT

Hereafter, embodiments of the invention will be described with reference to the drawings.

Additionally, an example where the Bluetooth standard is used to establish the ACL link then data is transmitted and received in ACL packets will be described below.

Figure 1:
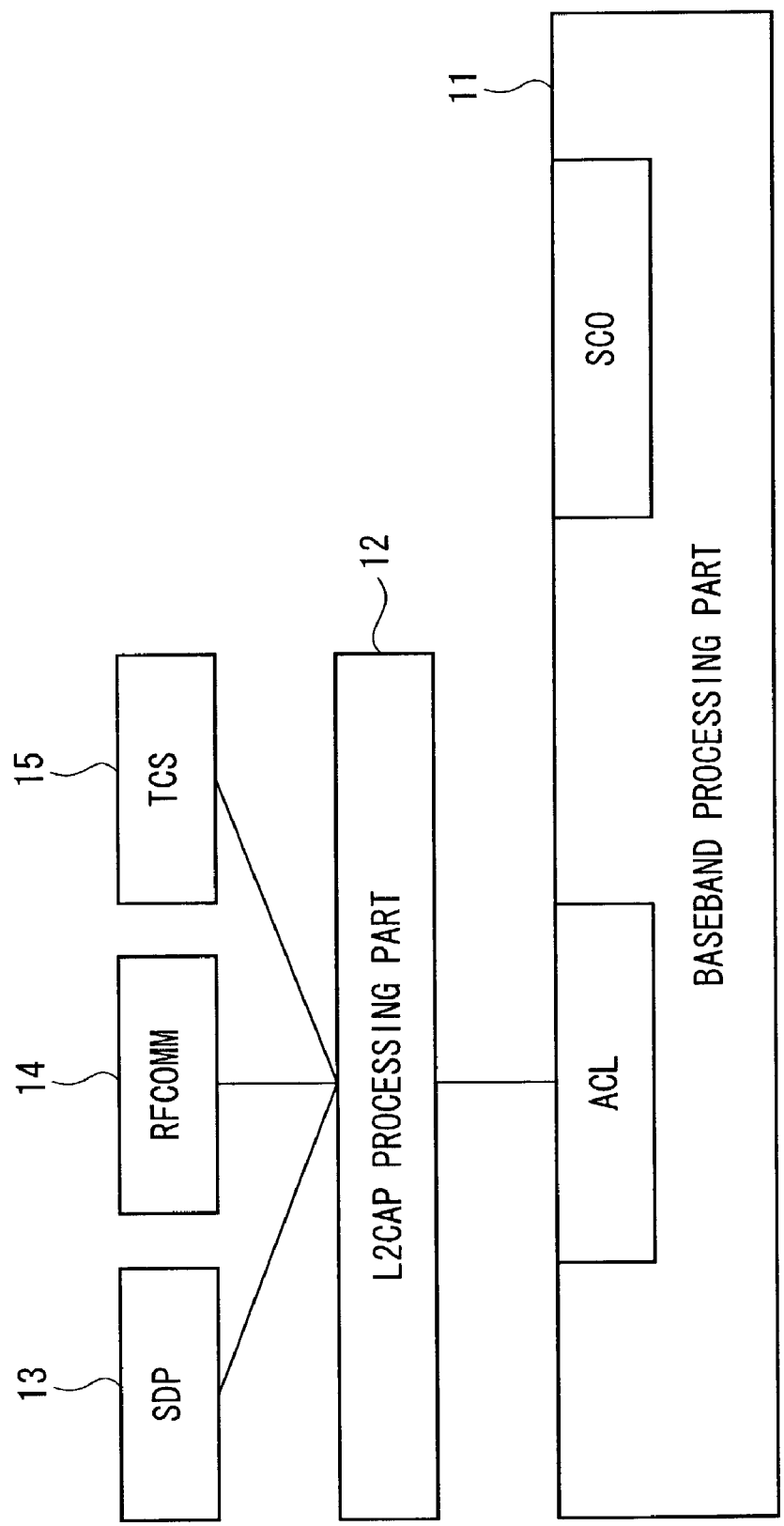
FIG. 1 is a diagram illustrating an exemplary configuration of a BT device in an embodiment of the invention.

FIG. 1 depicts one example of the configuration of a BT device in an embodiment of the invention (the configuration corresponds to a protocol stack).

In FIG. 1, on a baseband processing part 11 of a physical layer specification for Bluetooth, an L2CAP processing part 12 for executing a data link layer specification (L2CAP: Logical link Control and Adaptation Protocol) utilizing the ACL link is placed. Then, as an upper level protocol for utilizing the L2CAP processing part 12, there exist protocols (discrete processing parts corresponding to these protocols) such as a service discovery protocol (SDP) 13, an RFCOMM 14 and a telephony control protocol specification (TCS) 15. In addition, when the SCO link is used, the upper level protocols for utilizing SCO transfer are to be directly placed on the baseband processing part 11 without using the L2CAP processing part 12. In the embodiment, the case where the L2CAP processing parts 12 in BT devices communicate through the ACL link will be described.

Figure 2:
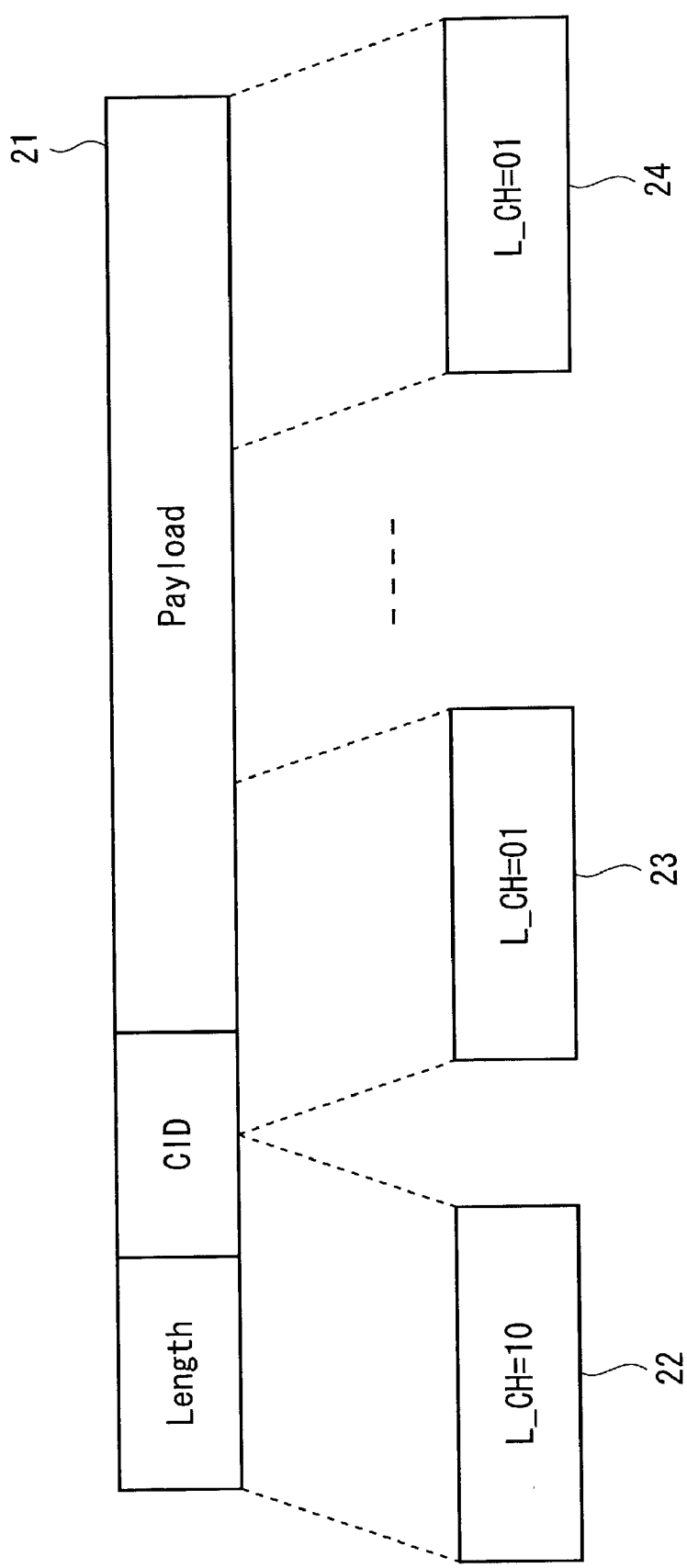
FIG. 2 is a diagram illustrating an example of splitting a packet in an L2CAP processing part of the BT device in the embodiment.

FIG. 2 depicts an example of splitting a packet in the L2CAP processing part 12. In the drawing, 21 denotes a packet (L2CAP packet) defined by the L2CAP processing part 12. The L2CAP packet is formed of a Length field (two-octet length) for indicating an information payload size per octet, a CID (channel identifier) field (two-octet length) for specifying a destination channel end point of the packet, and a Payload field (0 to 65535-octet length) for storing communication information received from the upper level protocols. The Length field and the CID field are combined and called an L2CAP header.

An SAR (Segmentation And Reassembly) function mounted in the baseband processing part 11 splits the L2CAP packet 21 into a payload for the ACL packet handled in the baseband processing part 12, and it reassembles the L2CAP packet with the payload of the ACL packet. Furthermore, so that the SAR function (in the baseband processing part 11) of the BT device received with the ACL packet can reassemble it into the L2CAP packet, L_CH (logical channel) field (two-bit length) defined by the payload header of the ACL packet is used to indicate whether the ACL packet is a start part (continuation part) of the L2CAP packet. More specifically, rate "10" is set to the L_CH field in the ACL packet containing the first segment of the L2CAP packet (see an ACL packet 22 shown in FIG. 2), and rate "01" is set to the L_CH field in the ACL packets containing the subsequent segment (see ACL packets 23 and 24 shown in FIG. 2).

Figure 3:
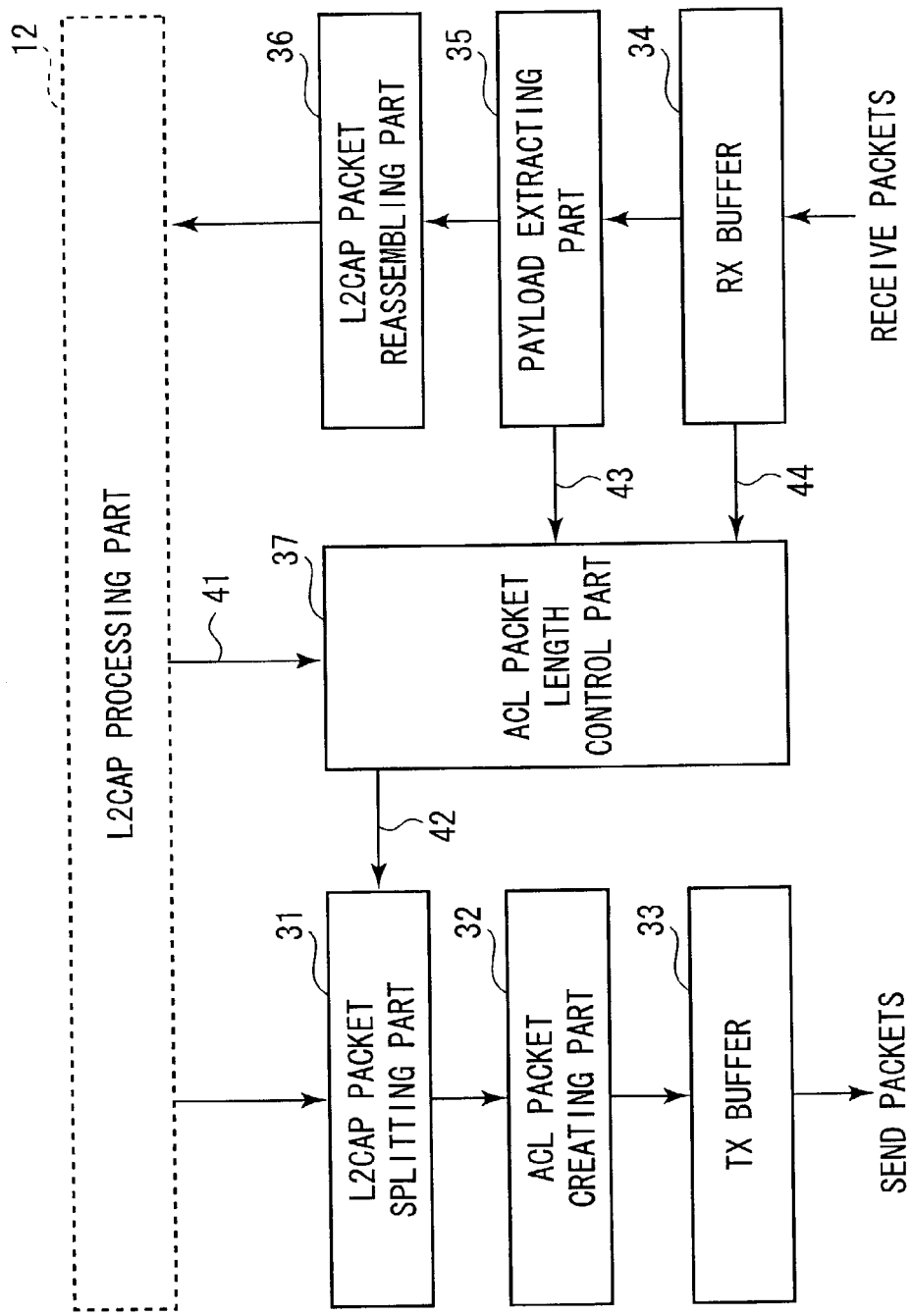
FIG. 3 is a diagram illustrating an exemplary internal configuration of the portion involving an SAR function in a baseband processing part of the BT device in the embodiment.

FIG. 3 depicts one example of an internal configuration of the portion involving the SAR function of the baseband processing part 11. As shown in FIG. 3, the portion involving the SAR function of the baseband processing part 11 includes an L2CAP packet splitting part 31 for segmenting the L2CAP packet, an ACL packet creating part 32 for creating ACL packets by giving a header, a TX buffer 33 for controlling the ACL packets or SCO packets to be transmitted onto time slots, an RX buffer 34 for receiving the ACL packets or SCO packets transmitted on time slots, a payload extracting part 35 for extracting payload information in the ACL packets, an L2CAP packet reassembling part 36 for reassembling the ACL packets to create the L2CAP packet, and an ACL packet length control part 37.

In FIG. 3, the size of the ACL packet transmitted by the BT device is determined in the packet length control part 37. Depending on desired communication performance between the BT devices established in the ACL link or transmission status of actual ACL packets, the ACL packet length control part 37 dynamically corrects the maximum rate for the ACL packet length and posts it to the L2CAP packet splitting part 31 (see 42 in the drawing). The L2CAP packet splitting part 31 splits the L2CAP packet so as to create ACL packets not exceeding the maximum ACL packet length posted from the ACL packet length control part 37.

In the embodiment shown in FIG. 1, the L2CAP processing part 12 is directly placed on the baseband processing part 11. As a further embodiment, as shown in FIG. 4, there is an embodiment in which an HCI processing part 16 for executing a host controller interface specification (HCI) is placed between a baseband processing part 11 and an L2CAP processing part 12.

Figure 4:
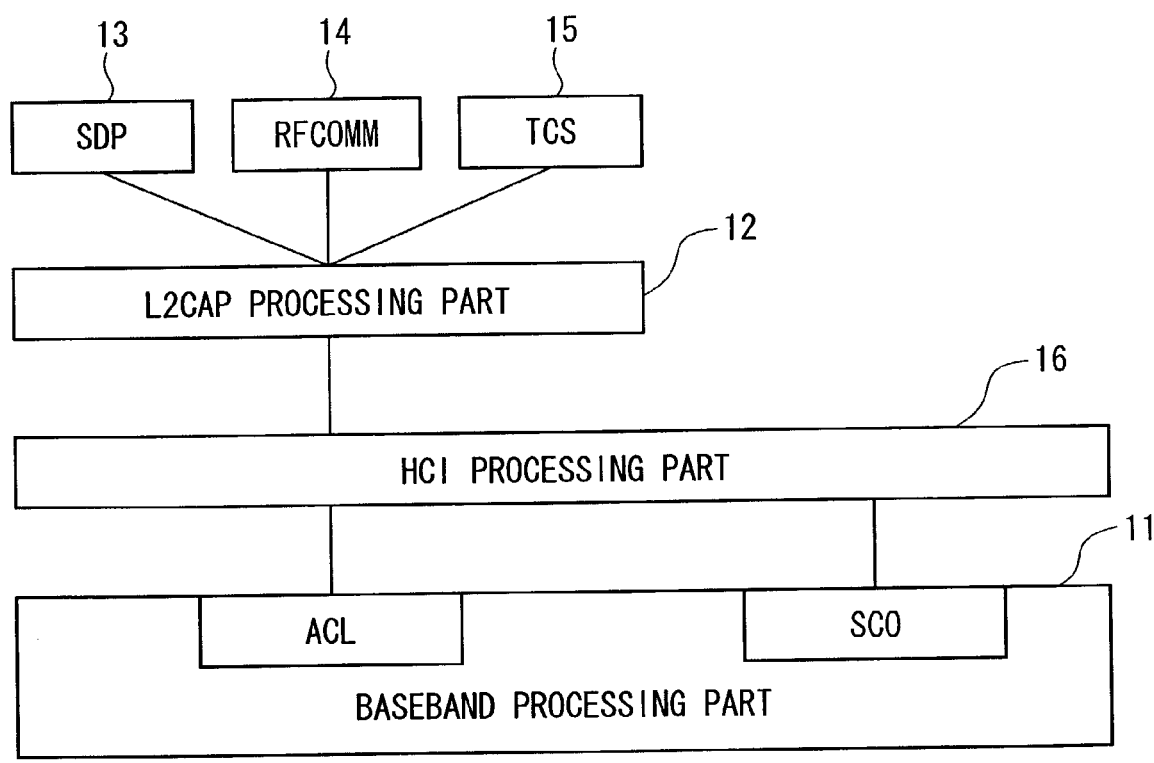
FIG. 4 is a diagram illustrating an exemplary configuration of a BT device in another embodiment.

For the embodiment shown in FIG. 4, for example, named is the case where a BT host (PC) installed with upper layer software such as the L2CAP processing part 12 is connected to a BT device mounted with the baseband processing part 11 through a USB (Universal Serial Bus). At this time, the BT host communicates with the BT device based on the HCI specification.

Figure 5:
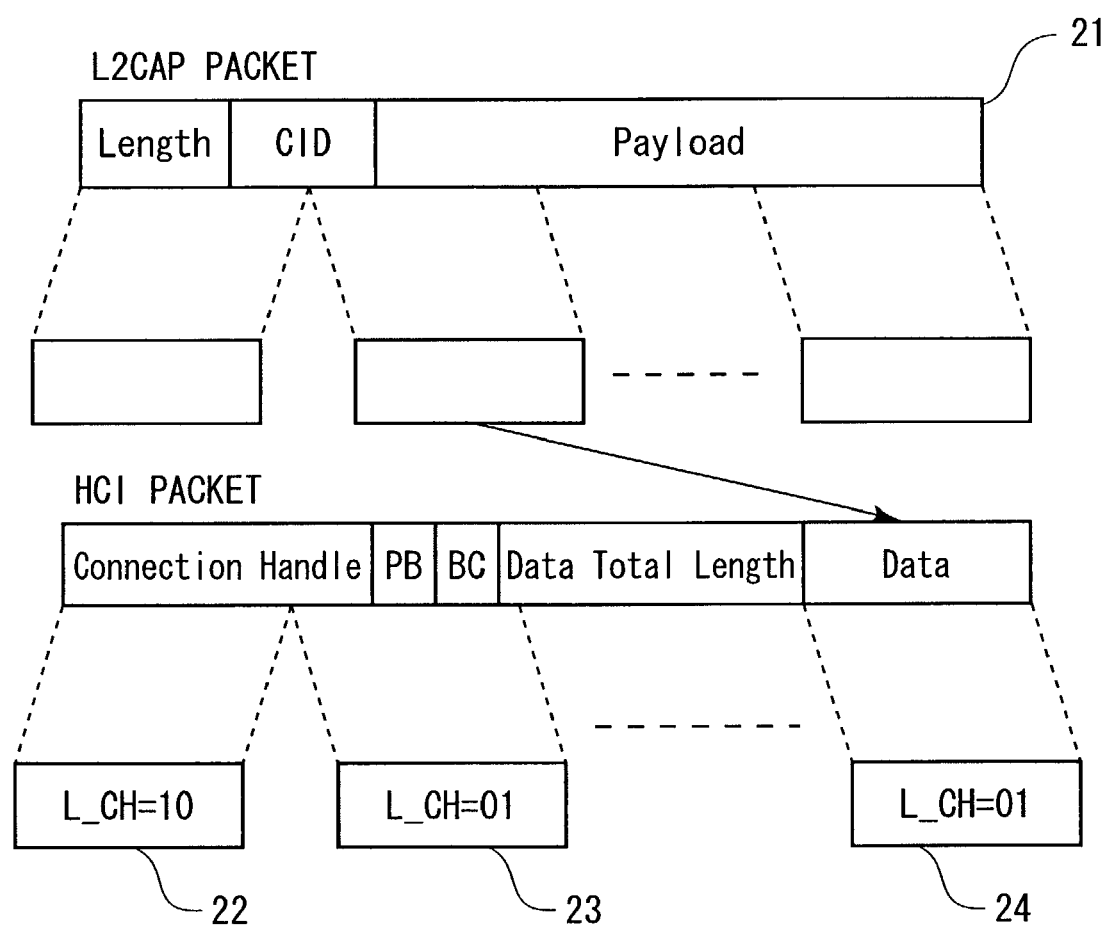
FIG. 5 is a diagram illustrating an example of splitting packets in an L2CAP processing part of the BT device in another embodiment.

In the case of using the HCI processing part 16 as shown in FIG. 4, an L2CAP packet is split as shown in FIG. 5. The L2CAP packet transmitted from the BT host is once split into packets (HCI packets) defined by the HCI specification in the HCI processing part 16 on the BT host side, and then they are passed to the BT device.

The HCI packet is formed of a Connection Handle field (12-bit length) used for identifying connection, a Packet Boundary flag (PB flag: two-bit length) indicating whether it is a first segment of the L2CAP packet, a Broadcast flag (BC flag: two-bit length) for indicating whether it is point-to-point communication or broadcast communication, a Data Total Length field (two-octet length) for indicating data length per octet, and a Data field for splitting and storing the L2CAP packet.

In addition, the maximum length of the HCI packet is set so as not to exceed the maximum rate of the buffer size held by the BT device to which the HCI packet is passed. The SAR function in the baseband processing part 11 that has received the HCI packet is to split the HCI packet into a payload of the ACL packet.

Figure 6:
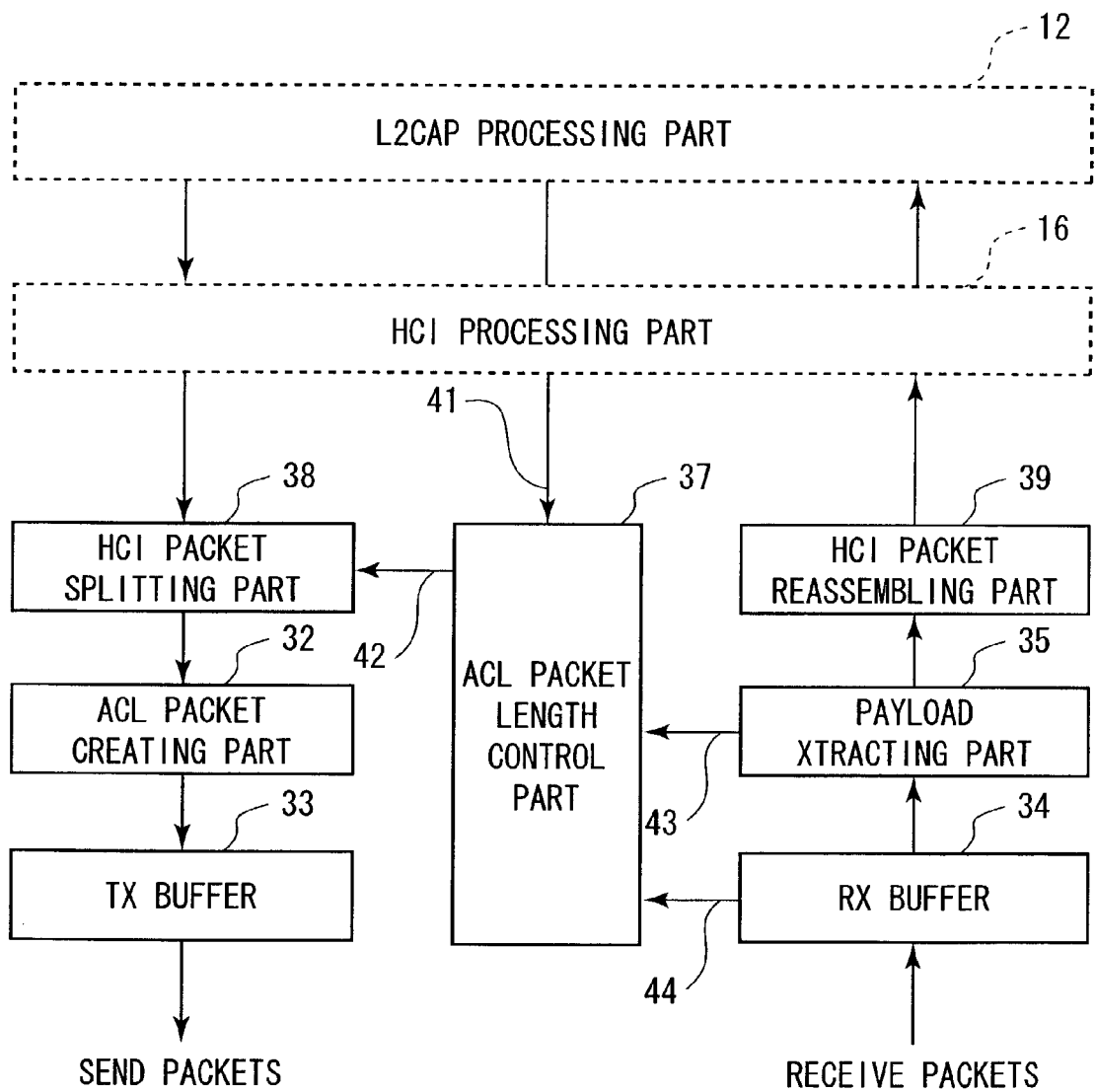
FIG. 6 is a diagram illustrating an exemplary internal configuration of a portion involving an SAR function in a baseband processing part of the BT device in another embodiment.

Furthermore, in the case of using the HCI processing part 16 as shown in FIG. 4, the internal configuration of the portion involving the SAR function of the baseband processing part 11 is that shown in FIG. 6.

Figure 7:
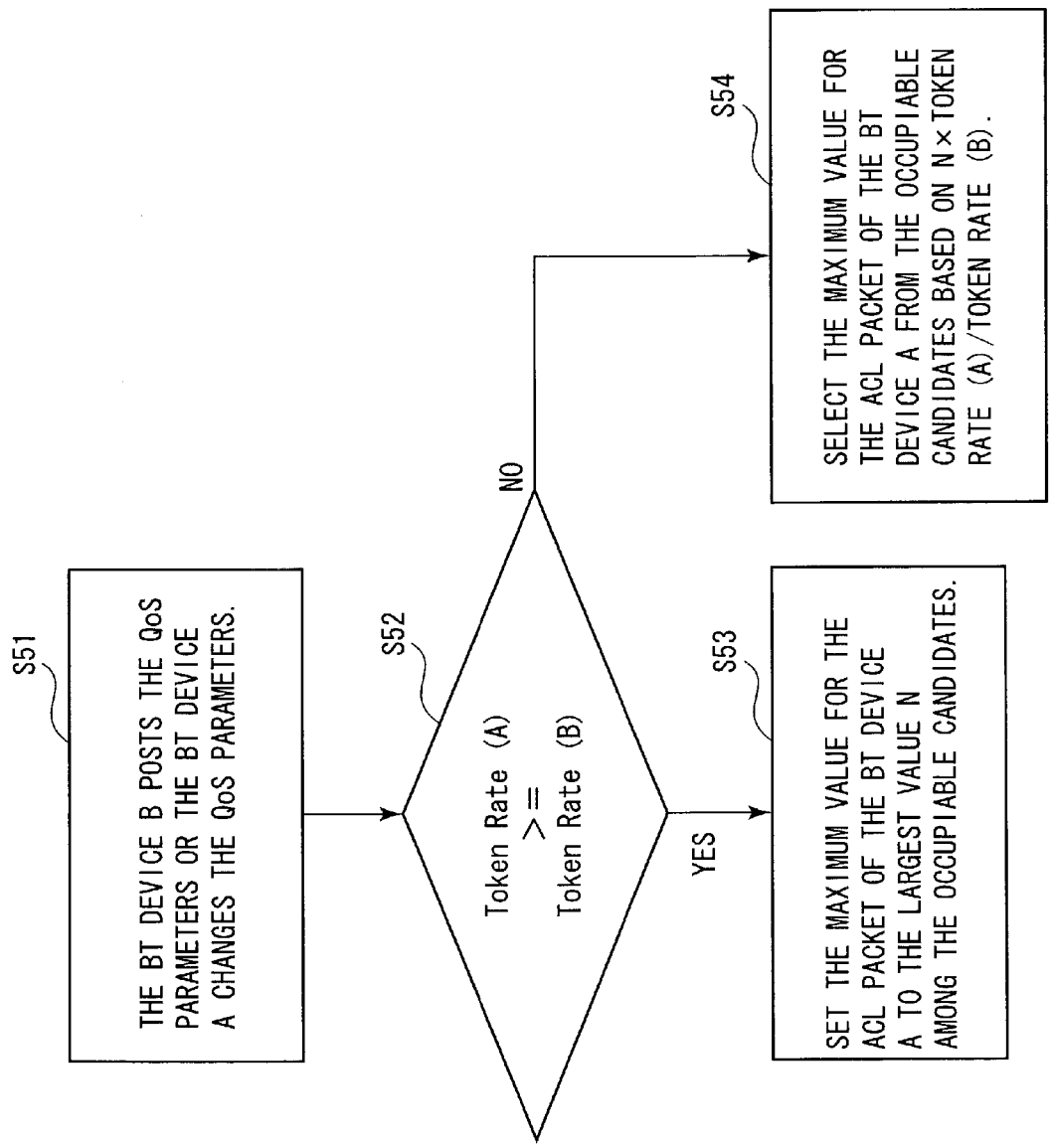
FIG. 7 is a flowchart illustrating one example of a procedure in determining the maximum rate for the ACL packet length in the ACL packet length control part shown in FIG. 3.

FIG. 7 depicts one example of a procedure in determining the maximum rate for the ACL packet length in the ACL packet length control part 37. The procedure shown in FIG. 7 illustrates the procedure in determining the maximum rate for the packet length of the ACL packet to be transmitted to a BT device B when a BT device A has established the ACL link with the BT device B (the procedure is the same in the BT device B (the BT device A is replaced by the BT device B in the procedure shown in FIG. 7)).

As the cue to change the maximum rate for the ACL packet length in the BT device A, for example, named is the case where the ACL link is established with the BT device B or services provided by using the ACL link are changed in the BT device A or BT device B.

When the BT device B posts the BT device A because QoS parameters are changed in the BT device B, the QoS parameters in the BT device B are described as the parameters of a Configuration Request packet and they are transmitted to the BT device A (the parameters of the Configuration Request packet are used in negotiating agreements on the ACL link between the L2CAP processing part 12 in one BT device and the L2CAP processing part 12 in the other BT device). In this case, the BT device A receives the notification of the QoS parameter from the BT device B and then it knows the QoS parameters of the BT device B.

The QoS parameters requested by the L2CAP processing part 12 in the BT device B are posted to the ACL packet length control part 37 (see 41 shown in FIG. 3).

In the meantime, the QoS parameters requested by the L2CAP processing part 12 in the BT device A itself are also posted to the ACL packet length control part 37 (see 41 shown in FIG. 3).

In addition, when the QoS parameters are changed in the BT device A, the BT device A similarly posts the QoS parameters to the BT device B.

When the QoS parameters are changed in the BT device A itself or in the BT device B (Step S51), the BT device A compares token rates, one of the QoS parameters (Step S52). The token rate is a rate allowing successive data transfer indicated per byte. The BT device A compares the token rate in the BT device A with the token rate in the BT device B and it determines which token rate is greater.

When the token rate requested by the BT device A is equal to the token rate requested by the BT device B or the former is greater than the latter, the maximum rate N is set as the maximum rate for the ACL packet in the BT device A among the candidates of current time slot numbers occupiable as the ACL packet (Step S53).

When the token rate requested by the BT device A is smaller than the token rate requested by the BT device B, the maximum rate for the ACL packet in the BT device A is selected from the candidates of current time slot numbers occupiable as the ACL packet based on a rate U obtained from Equation (1), where the token rate requested by the BT device A is set to T(A) and the token rate requested by the BT device B is set to T(B) (Step S54).

$$U = N \times T(A)/T(B) \qquad (1)$$

As a method for selecting the maximum rate for the ACL packet length in the BT device A based on a rate U, for example, the following procedures are named.

1. The minimum rate not exceeding U is selected from the candidates of current time slot numbers occupiable as the ACL packet, and the maximum rate for the ACL packet length is set so as to occupy time slots for the selected rate (the minimum rate not exceeding U).
2. Among the candidates of current time slot numbers occupiable as the ACL packet, the rate closest to U is selected and the maximum rate for the ACL packet length is set so as to occupy time slots for the selected rate (the rate closest to U).

Here, the candidates of current time slot numbers occupiable as the ACL packet will be described.

In the Bluetooth standard, the number of time slots occupiable by a single ACL packet is up to five time slots. The master continuously transmits packets at even numbered time slots and the slave continuously transmits packets at odd numbered time slots, whereby the maximum rate for the ACL packet length is selected from 1, 3 and 5 for setting.

Consequently, when the token rate requested by the BT device A is equal to the token rate requested by the BT device B, the maximum rate N is selected at Step S53 in both the BT device A and BT device B according to the procedure shown in FIG. 7. When the token rate requested by the BT device A is not equal to the token rate requested by the BT device B, the maximum rate N is selected at Step S53 in the BT device having a greater token rate and the rate conforming to Step S54 is selected in the BT device having a smaller token rate.

In the meantime, the SCO link can also be established between the BT devices other than the ACL link. In contrast to the ACL link, the SCO link reserves time slots at every fixed time interval beforehand for communication. Time slots usable as the ACL link are limited to the time slots not reserved by the SCO link.

Figure 8:
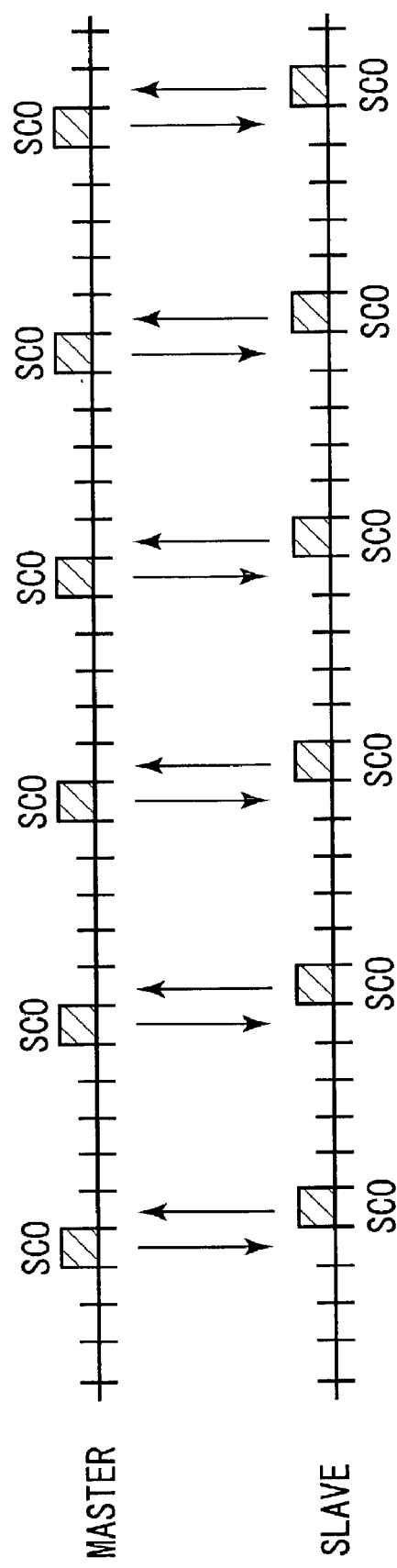
FIG. 8 is a diagram illustrating the overview of reserving time slots by the SCO link.

FIG. 8 depicts the overview of reserving time slots by the SCO link. In the example shown in FIG. 8, time slots are reserved for the SCO link at every six slots in both a master and slave. In this case, five cannot be set as the maximum rate for the ACL packet length. More specifically, only one and three are named as the candidates of time slot numbers occupiable as the ACL packet. Then, when a length of three time slots is set as the maximum rate for the ACL packet length in either the master or slave having a greater token rate according to the procedure shown in FIG. 7, the maximum rate for the ACL packet length in the other is necessarily to be a length of one time slot. When such allocation is determined to be undesirable from the ratio between the requested token rates (the ratio of the maximum time slot length is 3:1), the time slot length is set to one in both the master and slave as the maximum rate for the ACL packet length.

In this manner, the candidates of the time slot numbers occupiable as the ACL packet are varied in accordance with the setting status of the SCO link. On this account, each time events such as new setup of the SCO link and release of the existing SCO link are generated, processing is needed in which the time slot numbers occupiable as the ACL packet are reviewed.

In the following example, it will be described under the circumstances that the SCO link is not established for simplifying the embodiment. More specifically, the candidates of the time slot numbers occupiable as the ACL packet are one, three and five all the time.

Figure 9:
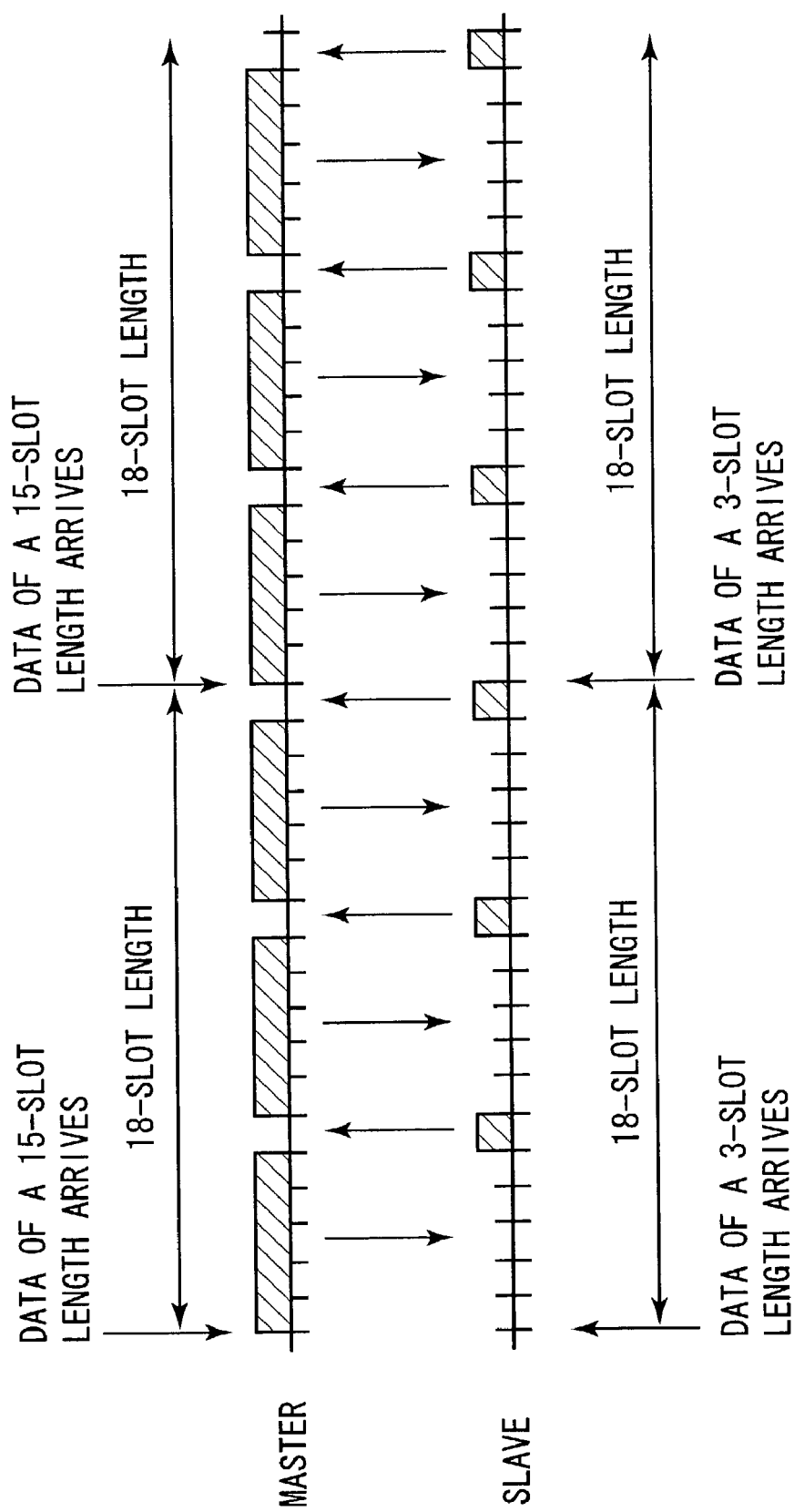
FIG. 9 is a diagram illustrating one example of the ACL packet communication on the ACL link when the maximum rate for the ACL packet length is determined in accordance with the procedure shown in FIG. 7 under the same conditions as FIG. 17.
Figure 17:
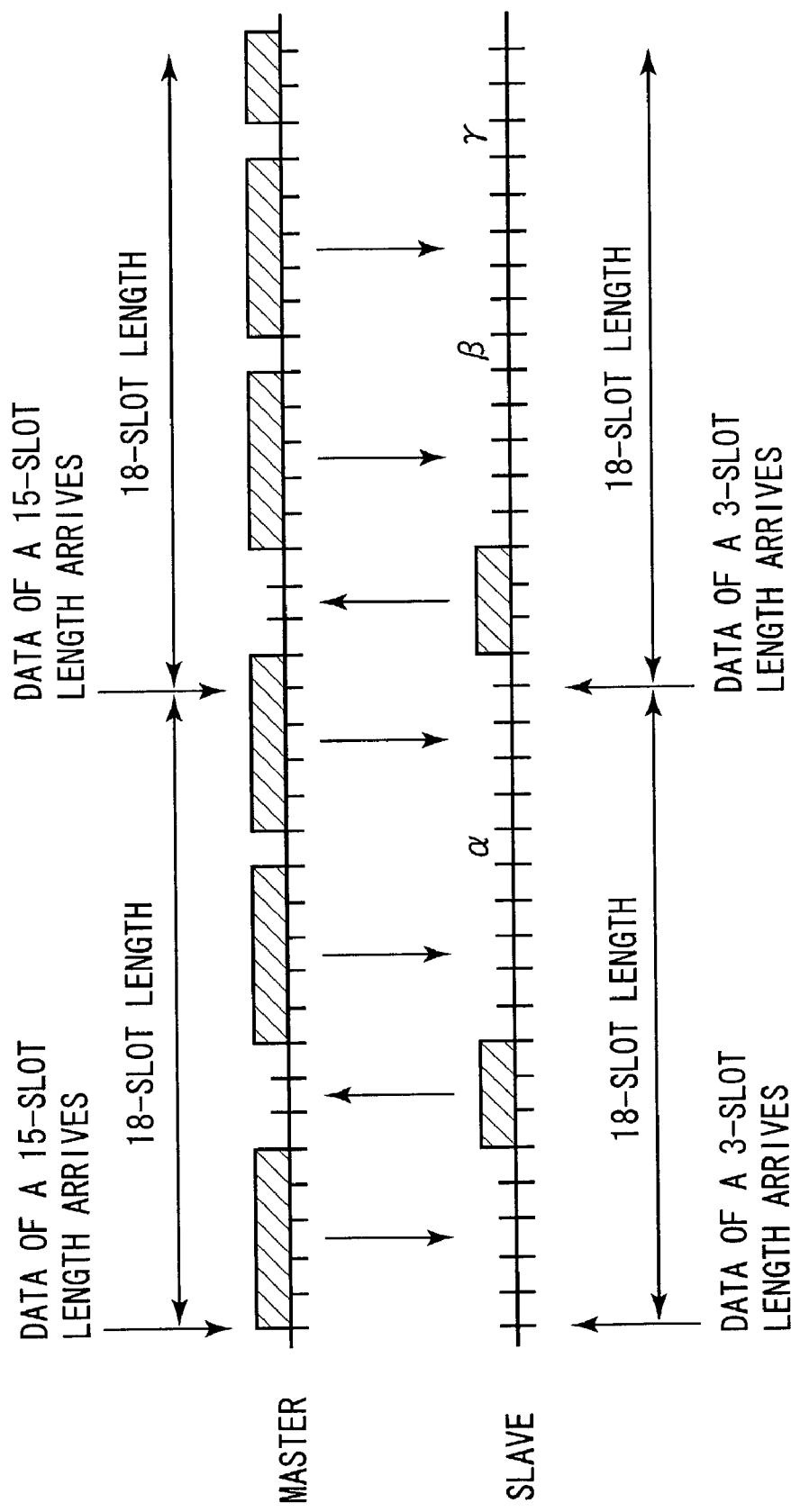
FIG. 17 is a diagram illustrating one example of the ACL packet communication on the ACL link in the case where a data transfer request is generated simultaneously in the master and the slave.

FIG. 9 depicts one example of the ACL packet communication on the ACL link in which the maximum rate for the ACL packet length has been determined according to the procedure shown in FIG. 7 under the same conditions as those shown in FIG. 17. In the example shown in FIG. 17, both the master and slave could transmit ACL packets corresponding to a length of five time slots. Suppose the token rate, one of the QoS parameters requested by both the master and slave sides is equal to the data arrival process shown in FIG. 17. In this case, the ratio between the token rates of the master and slave sides is 5:1. Thus, the maximum rate for the ACL packet length to be set in the master side is set equal to a length of five time slots. On the other hand, the maximum rate for the ACL packet length set in the slave side is:

$$5 \times 1/5 = 1,$$

according to the Equation (1), being set equal to a length of one time slot.

When the maximum rate for the ACL packet length is set according to the procedure shown in FIG. 7, time slots α, β and γ where data is not transferred shown in FIG. 17 do not exist. This means that the ACL link resources are utilized more efficiently than the example shown in FIG. 17.

Figure 10:
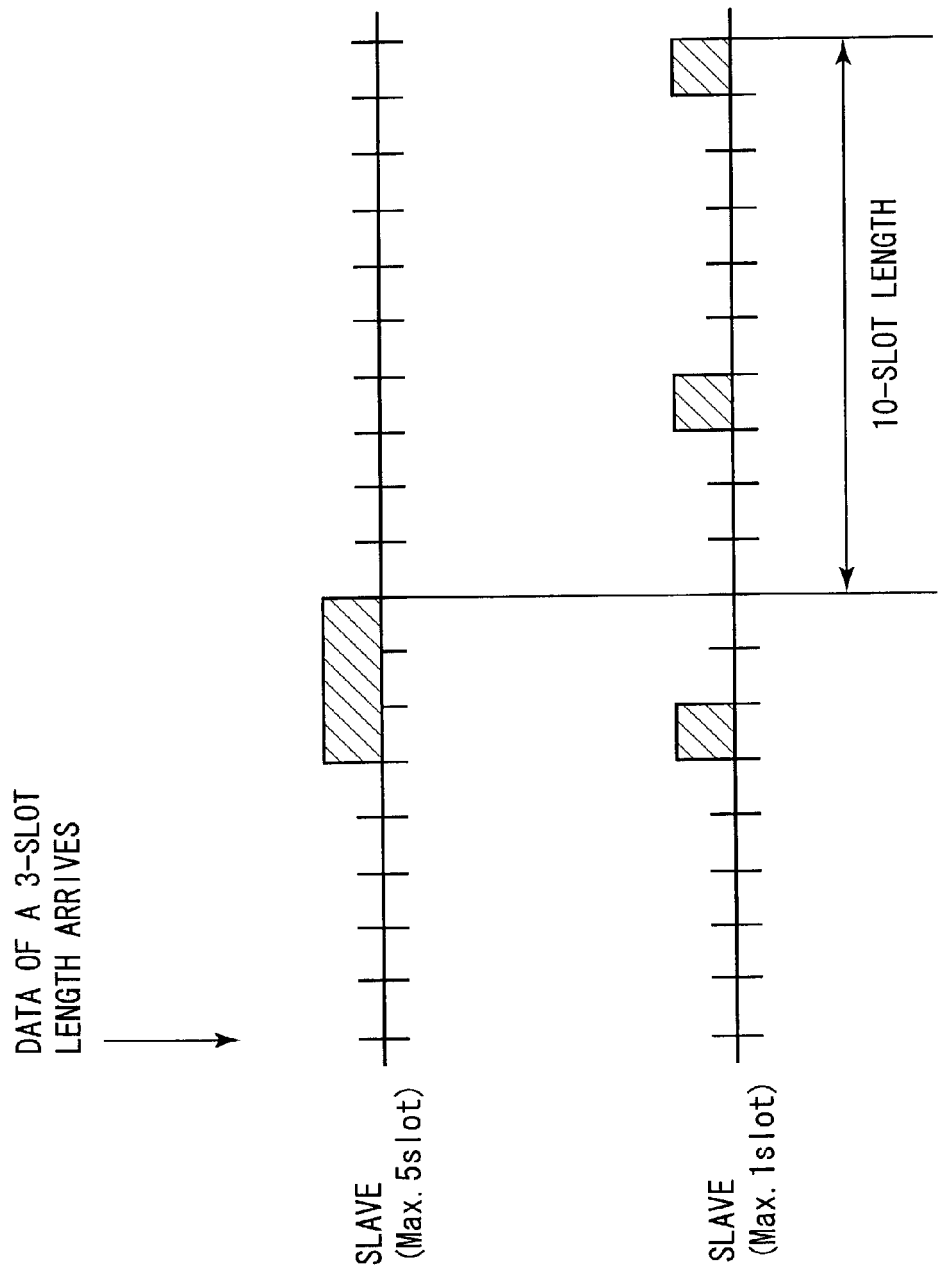
FIG. 10 is a diagram illustrating ACL packet patterns transmitted from the slaves shown in FIGS. 9 and 17.

In the meantime, when the maximum rate for the ACL packet length is set based only on the token rate of the request QoS parameters, violation is likely generated against the request QoS parameters other than the token rate. FIG. 10 depicts ACL packet patterns transmitted by the slaves shown in FIGS. 17 (a length of five time slots is set as the maximum rate for the ACL packet length) and 9 (a length of one time slot is set as the maximum rate for the ACL packet length) ((a) indicates the case of FIG. 17 and (b) indicates the case of FIG. 9).

To transmit the same data (it corresponds to a length of three time slots), time difference corresponding to a length of 10 time slots is generated to complete the entire data transfer in the example shown in FIG. 10 between the cases where a length of five time slots is set as the maximum rate for the ACL packet length and where a length of one time slot is set. A length of a single time slot is 625 microseconds, and thus a 6.25 millisecond delay is generated when a length of one time slot is set as the maximum rate for the ACL packet length. At this time, when a rate shorter than 6.25 milliseconds is set as the QoS parameter latency requested by the slave side, it is violation.

In the procedure shown in FIG. 7, only the token rate receives attention as the QoS parameter to determine the maximum rate for the ACL packet length, and thus the problem shown in FIG. 10 is generated.

Figure 11:
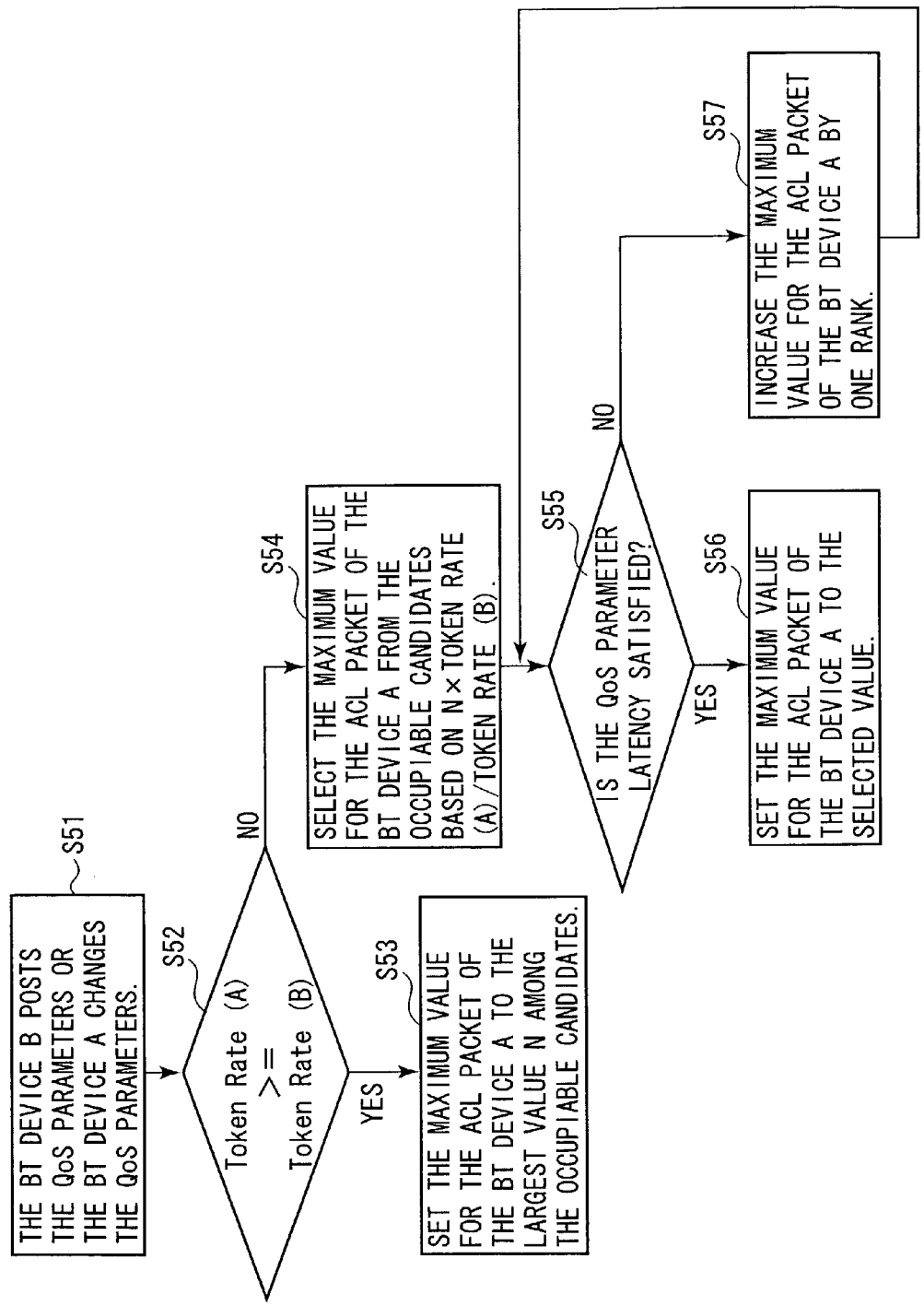
FIG. 11 is a flowchart illustrating one example of the procedure in determining the maximum rate for the ACL packet length also taking account of the QoS parameter latency of the ACL packet length control part shown in FIG. 3.

FIG. 11 depicts one example of the procedure in determining the maximum rate for the ACL packet length also taking into account of the QoS parameter latency in the ACL packet length control part 37.

In FIG. 11, Steps S51 to S54 are the same as the procedure shown in FIG. 7.

In the procedure shown in FIG. 11, when the maximum rate for the ACL packet length selected at Step S54 is used, it is examined whether the QoS parameter latency is also satisfied at the same time (Step S55). When it is determined that the maximum rate for the ACL packet length selected at Step S54 is used to satisfy the latency at the same time, the rate is set as the maximum rate (Step S56). On the other hand, when it is determined not to satisfy the latency, the current maximum rate for the ACL packet length is increased by one rank (Step S57). More specifically, when a length of one time slot is selected as the current maximum rate for the ACL packet, it is corrected to three, whereas when a length of three time slots is selected, it is corrected to five. Then, it is examined again whether the latency can be satisfied (Step S55).

In addition, not shown in FIG. 11, when the latency cannot be satisfied even though the maximum rate for the ACL packet length is set to any number, the L2CAP processing part 12 controls the request QoS parameters including the latency to be corrected.

Here, in the BT device in which the maximum rate for the ACL packet length is set to a length of one time slot or a length of three time slots according to the procedures shown in FIGS. 7 and 11, the ACL link can be used more effectively by temporarily increasing the maximum rate for the ACL packet length when data transfer is suspended in the BT device to be a communication counterpart using the ACL link.

Figure 12:
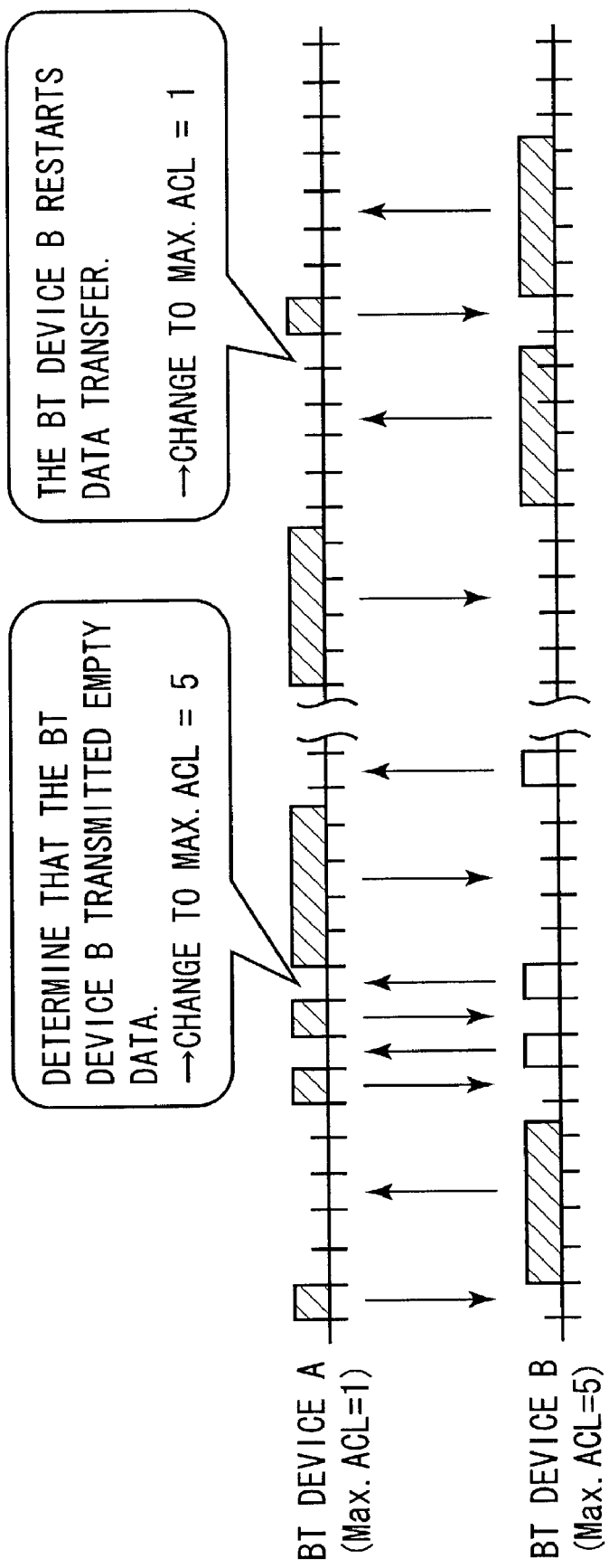
FIG. 12 is a diagram illustrating one example of the ACL packet communication in the case where the maximum rate for the ACL packet length is temporarily increased in accordance with the temporary suspension of data transfer in a BT device to be a communication counterpart.

FIG. 12 depicts one example of the ACL packet communication when the maximum rate for the ACL packet length is temporarily increased in accordance with the temporary suspension of data transfer in the BT device to be the communication counterpart. Additionally, in FIG. 12, unshaded ACL packets (three packets transmitted by the BT device B) indicate that communication information is not described in the payload of the packets (only ACK information on the ACL packet last received is described).

In the example shown in FIG. 12, the maximum rate for the ACL packet length is set to a length of one time slot in the BT device A and the maximum rate for the ACL packet length is set to a length of five time slots in the BT device B. Then, in the BT device A, it is determined that the BT device B does not have data to be transmitted by receiving the ACL packet not described with communication information in the payload from the BT device B. In the example shown in FIG. 12, the BT device A determines that the BT device B has temporarily suspended data transfer when it continuously receives two ACL packets not including communication information in the payload from the BT device B. Then, the BT device A sets the current maximum rate for the ACL packet length to a length of five time slots to create the following ACL packets and transmits them to the BT device B.

When the BT device B restarts data transfer, the BT device A is to receive the ACL packets described with communication information in the payload. This cues the BT device A in again setting the maximum rate for the ACL packet length to the initial rate (a length of one time slot in the example shown in FIG. 12), creating the following ACL packets and transmitting them to the BT device B.

As described above, in order to realize correcting the maximum rate for the ACL packet length in accordance with the temporary suspension of data transfer in the BT device to be the communication counterpart, the payload extracting part 35 (FIG. 3) determines at the step of reassembling the L2CAP packet from the received ACL packet whether the ACL packet contains payload information in the baseband processing part 11 of the BT device. When payload information is not contained, it is posted to the ACL packet length control part 37 (FIG. 3) (see 43 in FIG. 3).

Furthermore, in the example shown in FIG. 12, it has been determined whether the BT device to be the communication counterpart is temporarily suspending data transfer based on whether the ACL packet with no payload information has been received. However, the same determination is feasible based on whether the BT device to be the communication counterpart has transmitted the ACL packet. In this case, the RX buffer 34 (FIG. 3) for receiving ACL packets determines whether the ACL packet has been received from the BT device to be the communication counterpart at a predetermined time slot. When it does not receive the ACL packet, it posts that to the ACL packet length control part 37 (FIG. 3) (see 44 in FIG. 3).

Figure 13:
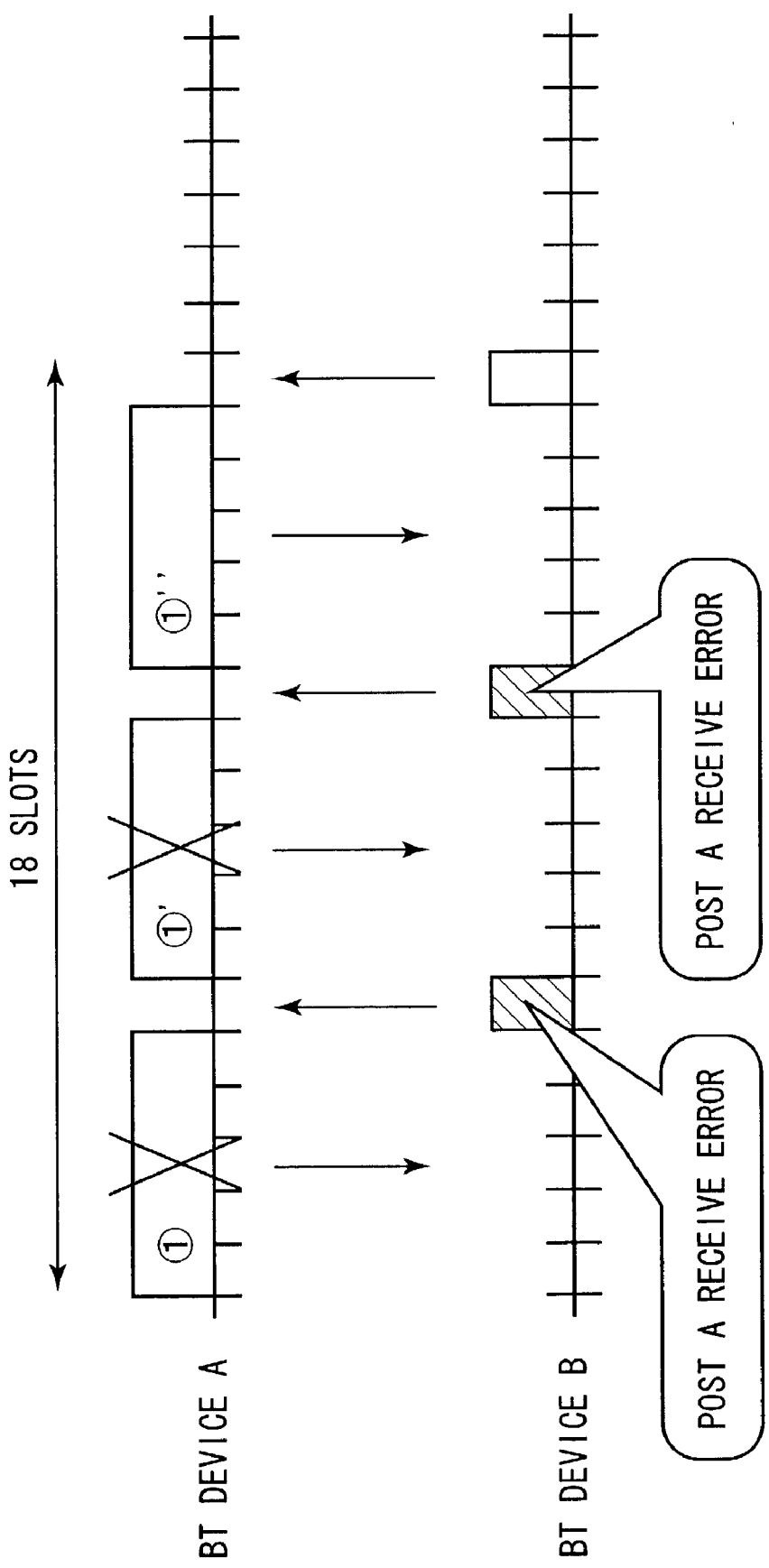
FIG. 13 is a diagram illustrating the manner of retransmitting an ACL packet (transmitting a single ACL packet) when errors are generated in ACL packet transmission.
Figure 14:
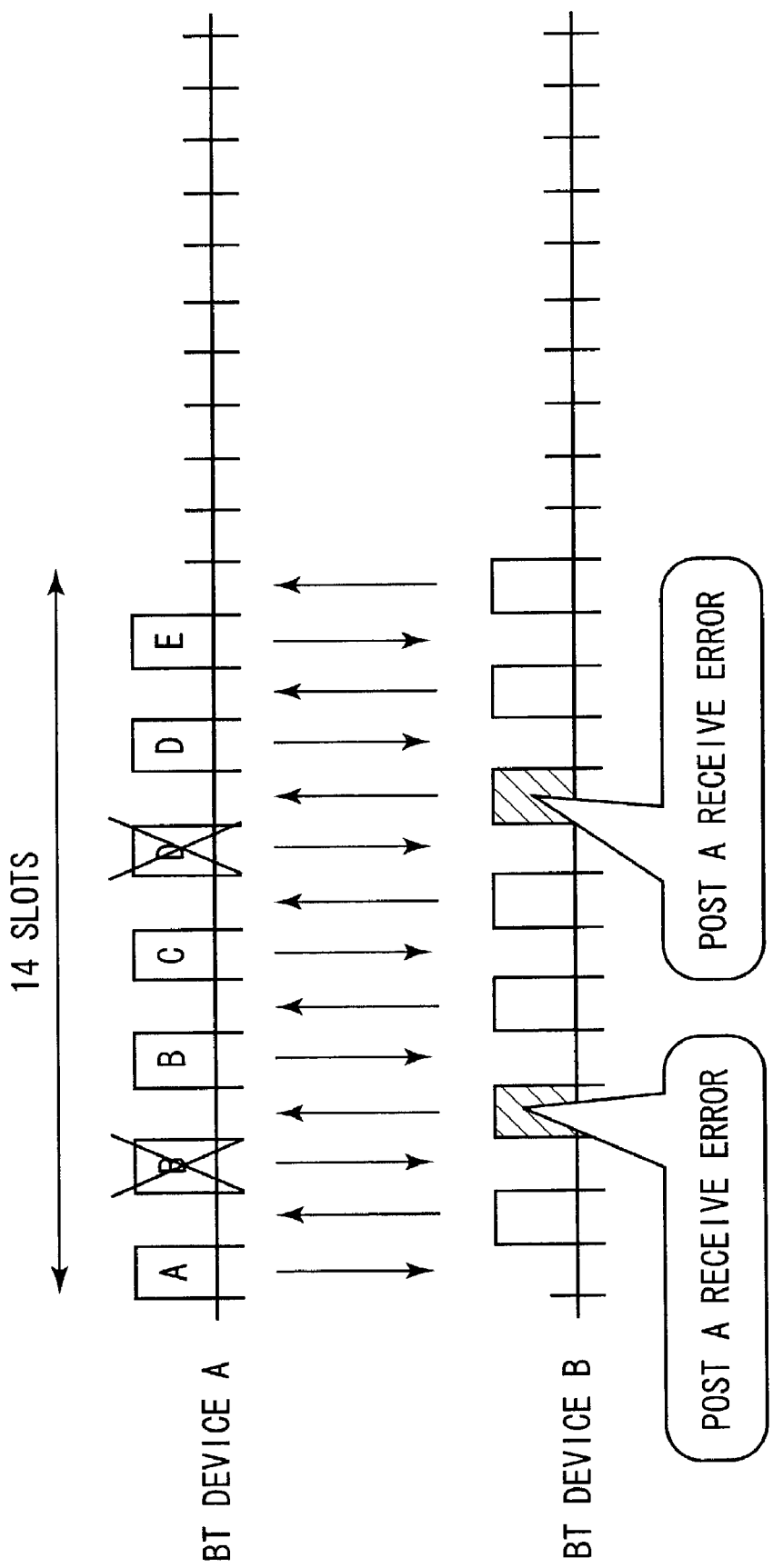
FIG. 14 is a diagram illustrating the manner of retransmitting ACL packets (transmitting by splitting into five ACL packets) when errors are generated in ACL packet transmission.

Next, FIGS. 13 and 14 depict the manner of retransmitting ACL packets when errors are generated in ACL packet transmission. In addition, the BT device A transmits data corresponding to a length of five time slots to the BT device B in both FIGS. 13 and 14, and errors are generated at the same time slots. Furthermore, in the example shown FIG. 13, data is transmitted in a single ACL packet 1 corresponding to a length of five time slots. In the example shown in FIG. 14, data is transmitted in five ACL packets A, B, C, D and E corresponding to a length of one time slot.

Comparing the results shown in FIGS. 13 and 14, the ACL packet 1 is retransmitted twice (1' and 1"), needing 13 time slots until transfer completion in FIG. 13.

On the other hand, the ACL packets B and D are retransmitted for one time each, needing 14 time slots until transfer completion in FIG. 14. More specifically, when the ACL packet length is greater, retransmission information accompanying the generation of errors becomes greater, and thus time necessary to complete retransmission becomes greater. In wireless transmission, burst errors partially concentrated can be generated due to fading, but in this case, the frequency of retransmitting sending packets is extremely increased. On this account, also taking account of wireless transmission environments, it is necessary to dynamically change the maximum rate for the ACL packet length.

Figure 15:
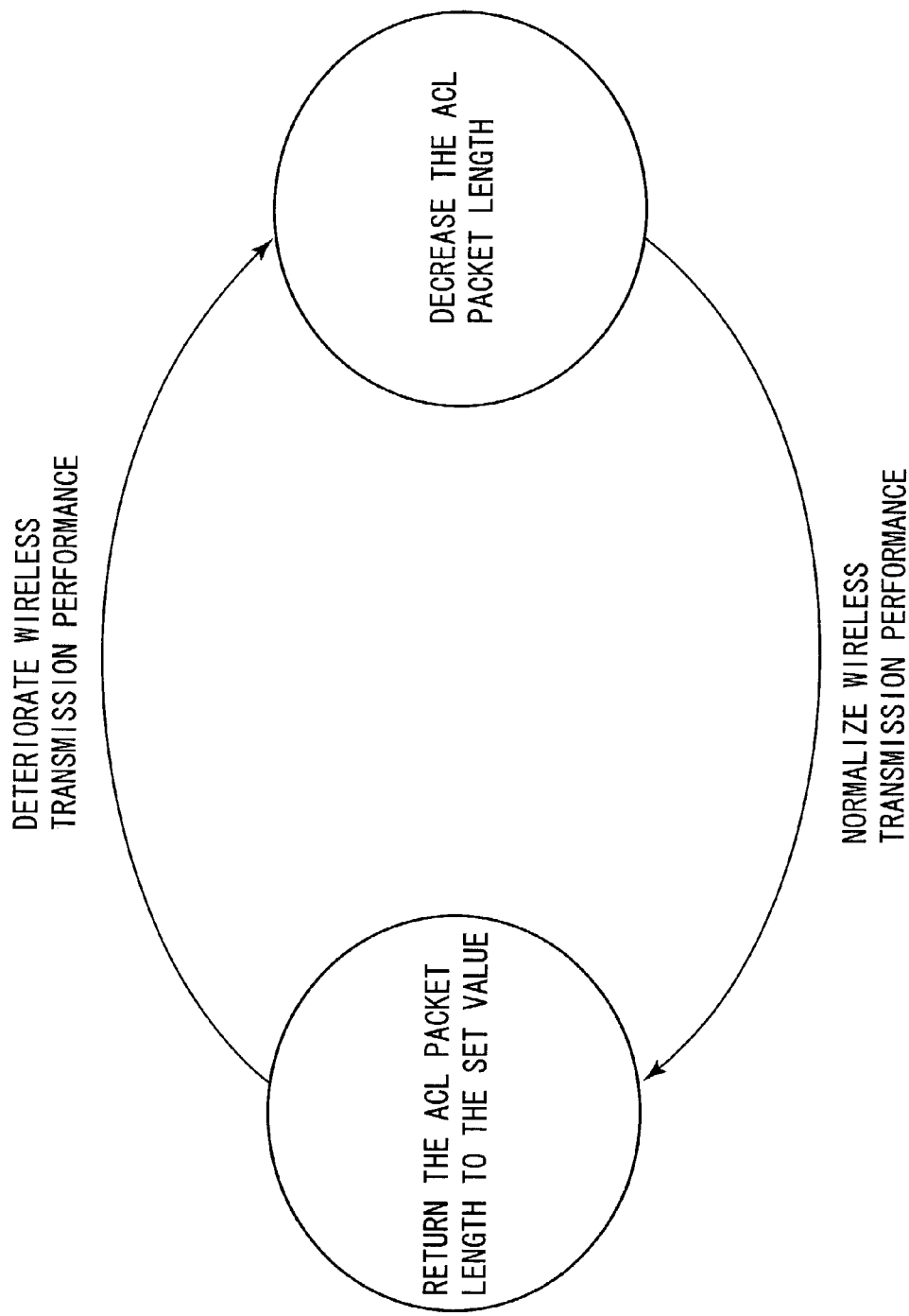
FIG. 15 is a diagram illustrating a concept of changing the maximum rate for the ACL packet length based on the deterioration of transmission performance.
Figure 16:
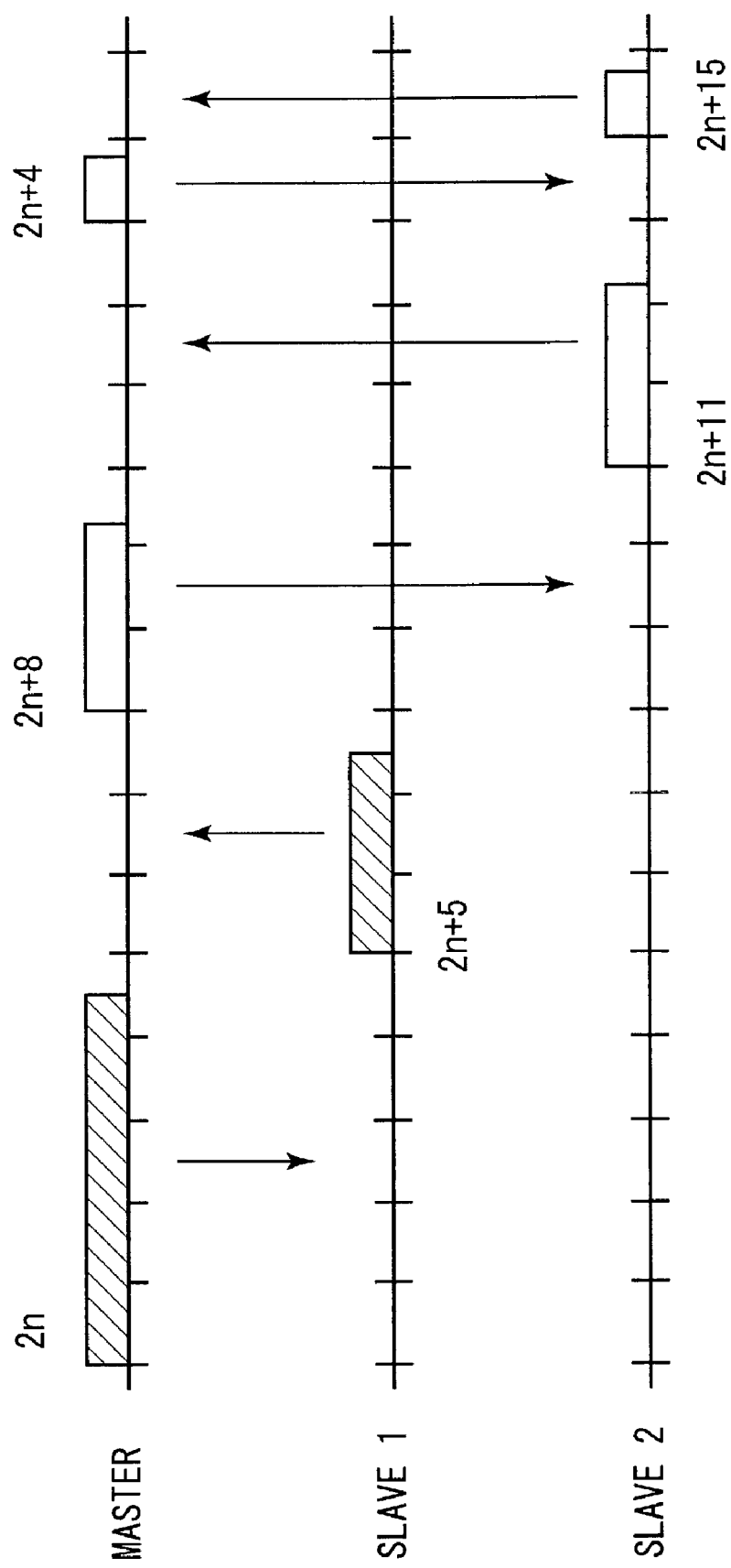
FIG. 16 is a diagram illustrating one example of the ACL packet communication between the master and the slaves using the ACL link.

Next, FIG. 15 depicts the concept of changing the maximum rate for the ACL packet length due to the deterioration of transmission performance. Such changes are done that it is determined in the BT device whether transmission performance is deteriorated or transmission performance is not deteriorated and is normal, and the maximum rate for the ACL packet length is set to default (it is the maximum rate determined according to the procedure shown in FIG. 7 or 11), or the maximum rate for the ACL packet length is decreased (it is set equal to a length of one time slot).

In addition, for the scheme of determining whether transmission performance is deteriorated, a method of referring acknowledge information described in the header of the ACL packet transmitted from the BT device to be a communication counterpart can be considered. The header of the ACL packet is provided with one-bit information (ARQN) indicating acknowledge. ARQN=1 indicates that reception has been done normally and ARQN=0 indicates that reception has not been done normally, whereby posting it to the sender BT device. For example, when the BT device receives the ACL packet of ARQN=0 for a predetermined times within fixed time, it determines that transmission performance is deteriorated, and it decreases the maximum rate for the sending ACL packet length. Furthermore, the BT device examines the ARQN rate of the received ACL packet after the maximum rate for the ACL packet length has been decreased. When it received no ACL packets of ARQN=0 within fixed time, it determines that the deterioration of transmission performance has been eliminated, and it returns the maximum rate for the sending ACL packet length to the set rate. Moreover, when a BT device does not receive the ACL packet that must contain acknowledge information for the transmitted ACL packet despite of requesting acknowledge information, the BT device assumes that it has received the ACL packet of ARQN=0.

In addition, the function corresponding to the portion performing processing such as calculation and control among the components described above can be realized as software (in this case, the BT device is incorporated with a computer (a CPU and an MPU) and the built-in computer runs the software).

Furthermore, the function corresponding to the portion performing processing such as calculation and control among the components described above can also be implemented as a program for allowing a computer to execute predetermined units (or for allowing a computer to function as predetermined units, or for allowing a computer to implement predetermined functions), which can be implemented as a computer readable medium recorded with the program as well.

Moreover, the configuration shown in the embodiments is an example, which does not mean to exclude configurations other than that. Other configurations are also feasible such that a part of the configuration exemplified is replaced by another one, a part of the configuration exemplified is omitted, a part of the configuration exemplified is added with another function or element, or these are combined. Besides, the other configurations equivalent to the exemplified configuration, the other configurations including the portion logically equivalent to the exemplified configuration, and the other configurations including the portion logically equivalent to the essential portions of the exemplified configuration are feasible as well. In addition, the other configurations attaining purposes which are the same or similar to those in the exemplified configuration and the other configurations exerting advantages which are the same or similar to those in the exemplified configuration are also feasible.

Furthermore, variations of each of the components exemplified in the embodiments of the invention can be combined and implemented properly.

Moreover, the embodiments of the invention include and contain the inventions in various viewpoints, steps, concepts and categories such as the invention as discrete devices, the invention of two or more devices involved, the invention as the overall system, the invention of components in the discrete devices, and the invention of methods corresponding to them.

Accordingly, the invention can be extracted from the contents disclosed in the embodiments of the invention without limiting to the exemplified configurations.

The invention is not limited to the embodiments described above, which can be modified variously in the technical scope.

According to the invention, the ACL link resources can be utilized effectively in transmitting and receiving data in ACL packets after the Bluetooth standard is used to establish the ACL link.

What is claimed is:

1. A method of packet transmission between a first communication device and a second communication device after a link is established by short-range wireless communications, the method of packet transmission comprising:

receiving a first rate from the second communication device, the first rate is requested by the second communication device in transferring data to the first communication device from the second communication device;

preparing a second rate representing a rate of the data transfer from the first communication device to the second communication device; and determining a maximum packet size of a packet to be transmitted to the second communication device from the first communication device based on a ratio of the first rate to the second rate stored in the first communication device in transferring data to the second communication device from the first communication device, wherein the short-range wireless communications are based on the Bluetooth standard, the link is an ACL link (Asynchronous Connection-Less), and the packet is an ACL packet, in which the ACL packet is transmitted per time slot obtained by time division of a physical channel, and the first communication device compares the first rate with the second rate, when the second rate is not smaller than the first rate, the maximum rate for the ACL packet size transmitted by the first communication device is set so as to occupy a largest time slot rate among candidates of the maximum rate for time slot size occupiable by the ACL packet, and when the second rate is smaller than the first rate, a rate closest to a rate U among the candidates of the maximum rate for time slot size occupiable by the ACL packet is selected and set as the maximum rate for time slot number occupiable by the ACL packet transmitted by the first communication device based on the rate U obtained by $U=N \times S/T$ where the time slot rate is N, the first rate is S, and the second rate is T, and the maximum rate for ACL packet size transmitted by the first communication device is set so as to conform the maximum rate for time slot number.

2. The method of packet transmission according to claim 1, wherein as the maximum rate for time slot number occupiable by the ACL packet transmitted by the first communication device, a minimum rate above the rate U is selected and set from the candidates of the maximum rate for time slot size occupiable by the ACL packet.

3. The method of packet transmission according to claim 2, wherein the candidates of the maximum rate for time slot size occupiable by the ACL packet are those extracting only occupiable time slot sizes from time slots excluding time slots currently reserved for an SCO link among rate 1, 3 and 5.

4. The method of packet transmission according to claim 2, wherein when receiving no ACL packet containing payload information from the second communication device for fixed time, the first communication device changes the maximum rate for ACL packet size transmitted by the first communication device to the largest time slot rate N among the candidates of the maximum rate for time slot size occupiable by the ACL packet, and when again receiving an ACL packet containing payload information from the second communication device after this change, the first communication device returns the maximum rate for packet size transmitted by the first communication device to the rate before the change.

5. The method of packet transmission according to claim 2, wherein when determining that transmission performance is deteriorated in the ACL link established with the second communication device, the first communication device decreases the maximum rate for ACL packet size transmitted by the first communication device, and when determining that the deterioration of transmission performance is avoided in the ACL link established with the second communication device after this decrease, the first communication device returns the maximum rate for ACL packet size transmitted by the first communication device to the rate before the decrease.

6. The method of packet transmission according to claim 5, wherein the first communication device determines whether transmission performance is deteriorated in the ACL link established with the second communication device, based on acknowledge information to the ACL packet already sent from the first communication device, the acknowledge information is sent from the second communication device.

7. The method of packet transmission according to claim 1, wherein the candidates of the maximum rate for time slot size occupiable by the ACL packet are those extracting only occupiable time slot sizes from time slots excluding time slots currently reserved for an SCO link among rate 1, 3 and 5.

8. The method of packet transmission according to claim 7, wherein when determining that transmission performance is deteriorated in the ACL link established with the second communication device, the first communication device decreases the maximum rate for ACL packet size transmitted by the first communication device, and when determining that the deterioration of transmission performance is avoided in the ACL link established with the second communication device after this decrease, the first communication device returns the maximum rate for ACL packet size transmitted by the first communication device to the rate before the decrease.

9. The method of packet transmission according to claim 8, wherein the first communication device determines whether transmission performance is deteriorated in the ACL link established with the second communication device, based on acknowledge information to the ACL packet already sent from the first communication device, the acknowledge information is sent from the second communication device.

10. The method of packet transmission according to claim 1, wherein when receiving no ACL packet containing payload information from the second communication device for fixed time, the first communication device changes the maximum rate for ACL packet size transmitted by the first communication device to the largest time slot rate N among the candidates of the maximum rate for time slot size occupiable by the ACL packet, and when again receiving an ACL packet containing payload information from the second communication device after this change, the first communication device returns the maximum rate for ACL packet size transmitted by the first communication device to the rate before the change.

11. The method of packet transmission according to claim 1, wherein when determining that transmission performance is deteriorated in the ACL link established with the second communication device, the first communication device decreases the maximum rate for ACL packet size transmitted by the first communication device, and when determining that deterioration of transmission performance is avoided in the ACL link established with the second communication device after this decrease, the first communication device returns the maximum rate for ACL packet size transmitted by the first communication device to the rate before the decrease.

12. A wireless communication device comprising:

a short-range wireless communication unit adapted to transmit and receive data in a packet after a link is established with the other wireless communication device;

a receiving unit adapted to receive a first data transfer rate requested by the other wireless communication device established with the link;

a determining unit adapted to determine a maximum rate for packet size to be transmitted to the other wireless communication device based on a ratio between a second data transfer rate to the other wireless communication device and the first data transfer rate, the second data transfer rate stored in the wireless communication device, wherein the short-range wireless communication unit transmits and receives data based on the maximum rate for packet size to be transmitted to the other wireless communication device, the maximum rate is determined by the determining unit, and wherein the short-range wireless communications are based on Bluetooth™ standard, the link is an ACL link (Asynchronous Connection-Less), and the packet is an ACL packet, in which the ACL packet is transmitted per time slot obtained by time division of a physical channel; and a comparing unit adapted to compare the first data transfer rate with the second data transfer rate, wherein when the second data transfer rate is not smaller than the first data transfer rate, the maximum rate for ACL packet size transmitted by the wireless communication device is set so as to occupy a largest time slot rate among candidates of the maximum rate for time slot size occupiable by the ACL packet, and when the second requested rate is smaller than the first requested rate, a rate closest to a rate U among candidates of the maximum rate for time slot size occupiable by the ACL packet is selected and set as the maximum rate for time slot number occupiable by the ACL packet transmitted by the wireless communication device based on the rate U obtained by $U = N \times S/T$, where the time slot rate is N, the first data transfer rate is S, and the second data transfer rate is T, and the maximum rate for the ACL packet size transmitted by the wireless communication device is set so as to conform the maximum rate for time slot number.

13. The wireless communication device according to claim 12, wherein as the maximum rate for time slot number occupiable by the ACL packet transmitted by the wireless communication device, a minimum rate above the rate U is selected and set from the candidates of the maximum rate for time slot size occupiable by the ACL packet.

14. The wireless communication device according to claim 12, wherein the candidates of the maximum rate for time slot size occupiable by the ACL packet are those extracting only occupiable time slot sizes from time slots excluding time slots currently reserved for an SCO link among rate 1, 3 and 5.

15. The wireless communication device according to claim 12, wherein when an ACL packet containing payload information is not received from the other wireless communication device for fixed time, the maximum rate for ACL packet size transmitted by the wireless communication device is changed to the largest time slot rate N among the candidates of maximum rate for time slot size occupiable by the ACL packet, and when an ACL packet containing payload information is again received from the other wireless communication device after this change, the maximum rate for ACL packet size transmitted by the wireless communication device is returned to the rate before the change.

16. The wireless communication device according to claim 12, wherein when transmission performance is deteriorated in the ACL link established with the other wireless communication device, the maximum rate for ACL packet size transmitted by the wireless communication device is decreased, and when the deterioration of transmission performance is avoided in the ACL link established with the other wireless communication device after this decrease, the maximum rate for ACL packet size transmitted by the wireless communication device is returned to the rate before the decrease.

* * * * *